(12) United States Patent
Takizawa et al.

(10) Patent No.: US 11,373,807 B2
(45) Date of Patent: Jun. 28, 2022

(54) ELECTRONIC COMPONENT DEVICE

(71) Applicant: TDK CORPORATION, Tokyo (JP)

(72) Inventors: Keiichi Takizawa, Tokyo (JP); Naoto Imaizumi, Tokyo (JP); Shogo Murosawa, Tokyo (JP); Takeru Yoshida, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/136,661

(22) Filed: Sep. 20, 2018

(65) Prior Publication Data

US 2019/0096580 A1    Mar. 28, 2019

(30) Foreign Application Priority Data

Sep. 25, 2017 (JP) .............. JP2017-183949

(51) Int. Cl.
*H01G 4/232* (2006.01)
*H01G 4/005* (2006.01)
*H01G 2/06* (2006.01)
*H01G 4/30* (2006.01)
*H01G 4/12* (2006.01)

(52) U.S. Cl.
CPC ............. *H01G 4/232* (2013.01); *H01G 2/065* (2013.01); *H01G 4/005* (2013.01); *H01G 4/30* (2013.01); *H01G 4/12* (2013.01)

(58) Field of Classification Search
CPC .......... H01G 4/30; H01G 4/232; H01G 4/008; H01G 4/005; H01G 2/065; H01G 4/38; H01G 4/12; H10G 4/005

USPC .... 361/301.4, 321.1, 303, 306.3, 321.2, 328
See application file for complete search history.

(56) References Cited

U.S. PATENT DOCUMENTS

| | | | |
|---|---|---|---|
| 6,191,933 B1* | 2/2001 | Ishigaki ................. | H01G 4/232 361/309 |
| 6,288,887 B1 | 9/2001 | Yoshida et al. | |
| 2001/0001258 A1 | 5/2001 | Ishigaki et al. | |
| 2007/0000439 A1* | 1/2007 | Yokoyama .............. | B05C 1/027 118/258 |
| 2009/0244807 A1 | 10/2009 | Lee et al. | |
| 2010/0123994 A1 | 5/2010 | Nishisaka et al. | |
| 2014/0311787 A1* | 10/2014 | Park ....................... | H01G 2/065 174/260 |
| 2015/0131199 A1* | 5/2015 | Park ....................... | H01G 4/005 361/301.4 |

(Continued)

FOREIGN PATENT DOCUMENTS

| CN | 101740220 A | 6/2010 |
|---|---|---|
| CN | 104112595 A | 10/2014 |

(Continued)

*Primary Examiner* — Arun Ramaswamy
(74) *Attorney, Agent, or Firm* — Oliff PLC

(57) ABSTRACT

An electronic component device includes: an electronic component having: a base body having a pair of end surfaces facing each other and four side surfaces connecting the pair of end surfaces; and a pair of outer electrodes disposed on respective sides of the pair of end surfaces; metal terminals respectively electrically connected to the pair of outer electrodes; and joint portions joining and electrically connecting the outer electrodes to the metal terminals respectively, wherein the electronic component has a metal portion disposed on at least one surface of the four side surfaces, and the metal portion has a baked metal layer.

7 Claims, 12 Drawing Sheets

(56) References Cited

U.S. PATENT DOCUMENTS

| | | | |
|---|---|---|---|
| 2015/0325371 A1* | 11/2015 | Hattori | H01G 4/385 361/301.4 |
| 2015/0326109 A1* | 11/2015 | Fujii | H01G 4/232 323/304 |
| 2016/0189867 A1 | 6/2016 | Zaima et al. | |

FOREIGN PATENT DOCUMENTS

| | | |
|---|---|---|
| CN | 105097281 A | 11/2015 |
| JP | S62-017228 U | 2/1987 |
| JP | S62-042284 A | 2/1987 |
| JP | H03-038812 A | 2/1991 |
| JP | 2000-235932 A | 8/2000 |
| JP | 2001-210547 A | 8/2001 |
| JP | 2002-057066 A | 2/2002 |
| JP | 2003-022930 A | 1/2003 |
| JP | 2005-072452 A | 3/2005 |
| JP | 2010-141300 A | 6/2010 |
| JP | 2015-216201 A | 12/2015 |
| JP | 2016-127262 A | 7/2016 |
| TW | 394963 B | 6/2000 |

\* cited by examiner

ELECTRONIC COMPONENT DEVICE

TECHNICAL FIELD

The present disclosure relates to an electronic component device.

BACKGROUND

An electronic component device including an electronic component having a base body and an outer electrode disposed in the base body, a metal terminal electrically connected to the outer electrode, and a joint portion joining and electrically connecting the outer electrode and the metal terminal is known (for example, see Japanese Unexamined Patent Publication No. 2000-235932).

SUMMARY

The electronic component device described above is mounted on a circuit board. In an electronic component device, when bending occurs in a circuit board, bending may occur also in an electronic component joined to a metal terminal. Thereby, cracks may occur in a base body of the electronic component.

An objective of one aspect of the present disclosure is to provide an electronic component device in which occurrence of cracks m a base body of an electronic component can be inhibited.

An electronic component device according to one aspect of the present disclosure includes: an electronic component including: a base body having a pair of end surfaces facing each other and four side surfaces connecting the pair of end surfaces; and a pair of outer electrodes disposed on respective sides of the pair of end surfaces; metal terminals respectively electrically connected to the pair of outer electrodes; and joint portions joining and electrically connecting the outer electrodes to the metal terminals respectively, in which the electronic component has a metal portion disposed on at least one surface of the four side surfaces, and the metal portion has a baked electrode layer.

In the electronic component device according to one aspect of the present disclosure, the electronic component includes the metal portion disposed on at least one surface of the four side surfaces of the base body. The metal portion includes a baked metal layer. Generally, the baked metal layer is harder than the base body and has a higher rigidity than that of the base body. Further, since the metal portion includes the baked metal layer, adhesion between the metal portion and the base body can be secured. When such a metal portion is disposed on one surface of the base body described above, even when bending occurs in a circuit board, occurrence of bending in the electronic component of the electronic component device mounted on the circuit board can be inhibited by the rigidity of the metal portion. Therefore, occurrence of bending in the base body of the electronic component can be inhibited. As a result, in the electronic component device, occurrence of cracks in the base body of the electronic component can be inhibited.

In one embodiment, the electronic component may include an inner conductor disposed in the base body, and the inner conductor may be connected to the baked metal layer of the metal portion. In this configuration, since the inner conductor is connected to the baked metal layer of the metal portion, a strength of the metal portion can be increased and a rigidity of the metal portion can be further increased. Therefore, it is possible to further inhibit occurrence of bending in the base body of the electronic component. As a result, in the electronic component device, occurrence of cracks in the base body of the electronic component can be inhibited.

In one embodiment, the inner conductor may include: a first inner electrode electrically connected to one of the outer electrodes; a second inner electrode electrically connected to the other of the outer electrodes; and a plurality of third inner electrodes electrically connected to the metal portion, the first inner electrode and the second inner electrode may be disposed at a same position in a direction in which a pair of side surfaces are facing each other, the third inner electrode may be disposed to face each of the first inner electrode and the second inner electrode, a first capacitance unit may be constituted by the first inner electrode and the third inner electrode, and a second capacitance unit may be constituted by the second inner electrode and the third inner electrode. In this configuration, the plurality of third inner electrodes are electrically connected by the metal portion. Thus, the first capacitance unit and the second capacitance unit are electrically connected in series. Therefore, for example, when a problem occurs in one of the capacitance units, changes occur in electrostatic capacitance and a resistance value. Therefore, in the electronic component device, even when a problem occurs in the electronic component after having been mounted, the problem can be detected.

In the electronic component of the electronic component device, the first capacitance unit is formed in a region on one end surface side, and the second capacitance unit is formed in a region on the other end surface side. Therefore, in the electronic component, even when cracks occur in the base body due to bending of the base body, for example, the second inner electrodes disposed on the other end surface side may break, but breakage of the first inner electrodes disposed on one end surface side can be avoided. Therefore, in the electronic component, it is possible to protect the first capacitance unit. As described above, in the electronic component device, even when cracks occur in the base body of an electronic component, a portion of the capacitance units can be protected.

In one embodiment, the inner conductor may include: a first inner electrode electrically connected to one of the outer electrodes; a second inner electrode electrically connected to the other of the outer electrodes; and a plurality of third inner electrodes electrically connected to the metal portion, the first inner electrode may be disposed on one side of the side surfaces in the base body, the second inner electrode may be disposed on the other side of the side surfaces facing the one side surface in the base body, the third inner electrode may be disposed to face each of the first inner electrode and the second inner electrode, a first capacitance unit may be constituted by the first inner electrode and the third inner electrode, and a second capacitance unit may be constituted by the second inner electrode and the third inner electrode, in this configuration, the plurality of third inner electrodes are electrically connected by the metal portion. Thus, the first capacitance unit and the second capacitance unit are electrically connected in series. Therefore, for example, when a problem occurs in one of the capacitance units, changes occur in electrostatic capacitance and a resistance value. Therefore, in the electronic component device, even when a problem occurs in the electronic component after having been mounted, the problem can be detected.

In the electronic component of the electronic component device, the first capacitance unit is formed in a region on one side surface side, and the second capacitance unit is formed in a region on the other side surface side. Therefore, in the electronic component, even when cracks occur in the base body from both sides of the first outer electrode and the second outer electrode, for example, the second inner electrode disposed on the other side surface side may break, but breakage of the first inner electrode disposed on one side surface side can be avoided. Therefore, in the electronic component, it is possible to protect the first capacitance unit. As described above, in the electronic component device, even when cracks occur in the base body of the electronic component, a portion of the capacitance units can be protected.

In one embodiment, each of the pair of outer electrodes may include an electrode portion disposed on the one surface; and an area of the metal portion disposed on the one surface may be larger than an area of the electrode portion. With this configuration, since a strength of the metal portion can be increased, a rigidity of the metal portion can be increased. Therefore, it is possible to further inhibit occurrence of bending in the base body of the electronic component.

In one embodiment, an uneven portion may be provided at an edge of the metal portion in a direction in which the pair of end surfaces are facing each other. With this configuration, when bending is inhibited by the metal portion, a stress generated in the metal portion can be alleviated at the uneven portion. Therefore, a stress applied to the base body can be inhibited. As a result, occurrence of cracks in the base body of the electronic component can be further inhibited.

According to one aspect of the present disclosure, occurrence of cracks in the base body can be inhibited.

DETAILED DESCRIPTION

Hereinafter, preferred embodiments of the present disclosure will be described in detail with reference to the accompanying drawings. In the following description, the same elements or elements having the same functions will be referred to by the same reference signs and description thereof will not be repeated.

First Embodiment

Figure 1:
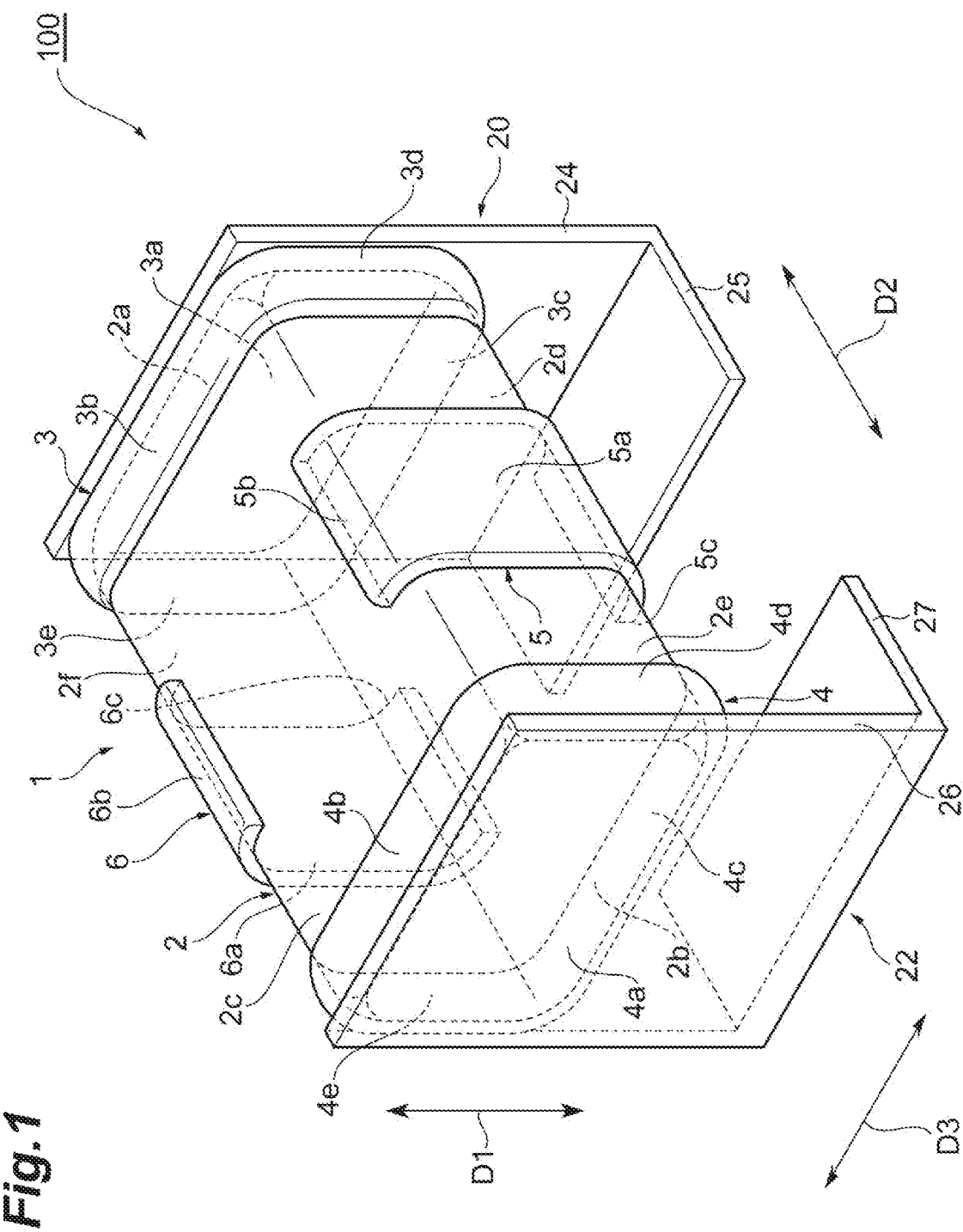
FIG. 1 is a perspective view of an electronic component device according to a first embodiment.
Figure 2:
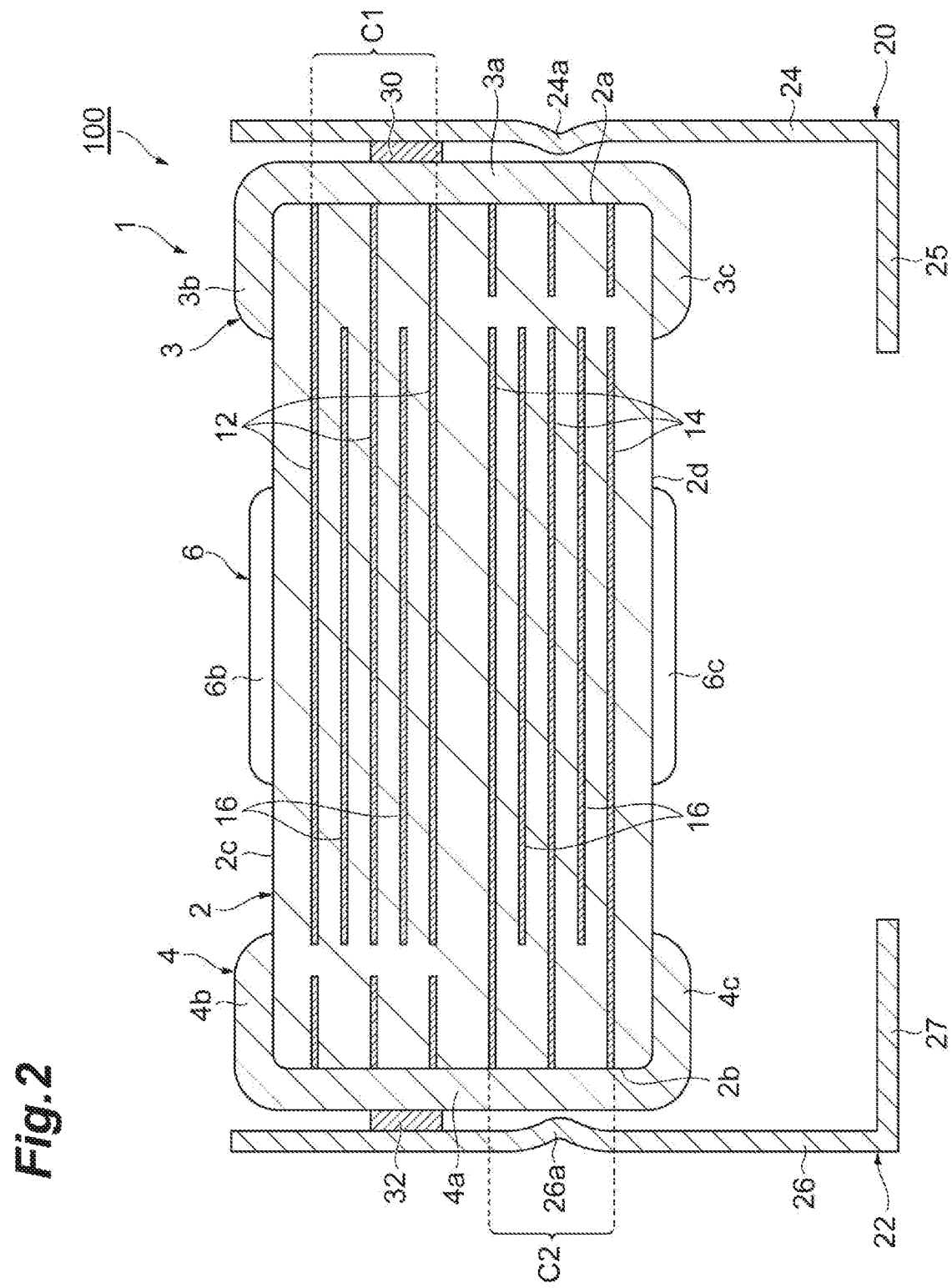
FIG. 2 is a view illustrating a cross-sectional configuration of the electronic component device illustrated in FIG. 1.

As illustrated in FIG. 1 or 2, an electronic component device 100 according to a first embodiment includes a multilayer capacitor (electronic component) 1, metal terminals 20 and 22, and joint portions 30 and 32.

As illustrated in FIGS. 1 and 2, the multilayer capacitor 1 includes a base body 2, and a first outer electrode 3, a second outer electrode 4, a first connecting conductor (metal portion) 5 and a second connecting conductor (metal portion) 6 which are disposed on outer surfaces of the base body 2.

The base body 2 has a rectangular parallelepiped shape. The rectangular parallelepiped shape includes a rectangular parallelepiped shape in which corner portions and edge line portions are chamfered, and a rectangular parallelepiped shape M which the corner portions and the edge line portions are rounded. The base body 2 includes, as outer surfaces thereof, a pair of end surfaces 2a and 2b facing each other, a pair of main surfaces (side surfaces) 2c and 2d facing each other, and a pair of side surfaces 2e and 2f facing each other. A direction in which the pair of main surfaces 2c and 2d face each other is a first direction D1. A direction in which the pair of end surfaces 2a and 2b face each other is a second direction D2. A direction in which the pair of side surfaces 2e and 2f face each other is a third direction D3. In this embodiment, the first direction D1 is a height direction of the base body 2. The second direction D2 is a long-side direction of the base body 2 and is perpendicular to the first direction D1. The third direction D3 is a width direction of the base body 2 and is perpendicular to the first direction D1 and the second direction D2.

The pair of end surfaces 2a and 2b extend in the first direction D1 to connect between the pair of main surfaces 2c and 2d. The pair of end surfaces 2a and 2b also extend in the third direction D3 (short-side direction of the pair of main surfaces 2c and 2d). The pair of side surfaces 2e and 2f extend in the first direction D1 to connect between the pair of main surfaces 2c and 2d. The pair of side surfaces 2e and 2f also extend in the second direction D2 (long-side direction of the pair of end surfaces 2a and 2b). In this embodiment, the main surface 2d is defined as a mounting surface facing another electronic device when the multilayer capacitor 1 is mounted on another electronic device (for example a circuit board, an electronic component, or the like).

The base body 2 is configured to have a plurality of dielectric layers (insulator layers) 10 laminated in a direction in which the pair of main surfaces 2c and 2d are facing each other. In the base body 2, a lamination direction of the plurality of dielectric layers 10 (hereinafter simply referred to as "lamination direction") coincides with the first direction D1. Each of the dielectric layers 10 is formed of a sintered body of a ceramic green sheet including, for example, a dielectric material ($BaTiO_3$-based dielectric ceramic, $Ba(Ti, Zr)O_3$-based dielectric ceramic, $(Bi, Ca)TiO_3$-based dielectric ceramic, or the like). In an actual base body 2, each of the dielectric layers 10 is integrated to such an extent that boundaries between the respective dielectric layers 10 cannot be visually recognized.

As illustrated in FIG. 2, the multilayer capacitor 1 includes a plurality of first inner electrodes 12, a plurality of first dummy electrodes 13, a plurality of second inner electrodes 14, a plurality of second dummy electrodes 15, and a plurality of third inner electrodes 16 as inner conductors arranged in the base body 2. In this embodiment, the number of the plurality of first inner electrodes 12 (here, three) is the same as the number of the plurality of second inner electrodes 14.

The plurality of first inner electrodes 12, the plurality of first dummy electrodes 13, the plurality of second inner electrodes 14, the plurality of second dummy electrodes 15, and the plurality of third inner electrodes 16 are formed of a conductive material normally used (for example, Ni, Cu, or the like) for inner electrodes of lamination-type electrical elements. The plurality of first inner electrodes 12, the plurality of first dummy electrodes 13, the plurality of second inner electrodes 14, the plurality of second dummy electrodes 15, and the plurality of third inner electrodes 16 are formed as a sintered body of a conductive paste containing the above-described conductive material.

The first inner electrodes 12, the second inner electrodes 14, and the third inner electrodes 16 are disposed at different positions (layers) in the first direction D1 of the base body 2. The first inner electrodes 12 and the third inner electrodes 16 are alternately arranged to face each other in the base body 2 with a distance therebetween in the first direction D1. The second inner electrodes 14 and the third inner electrodes 16 are alternately arranged to face each other in the base body 2 with a distance therebetween in the first direction D1. Each of the first inner electrodes 12 and each of the first dummy electrodes 13 are disposed at a same position (layer) in the base body 2. Each of the second inner electrodes 14 and each of the second dummy electrodes 15 are disposed at a same position (layer) in the base body 2.

As illustrated in FIG. 2, the plurality of first inner electrodes 12 are disposed in a region on one main surface 2c side in the first direction D1 of the base body 2. In this embodiment, the plurality of first inner electrodes 12 are disposed in a region on one main surface 2c side of a central portion in the first direction D1 of the base body 2.

Figure 3:
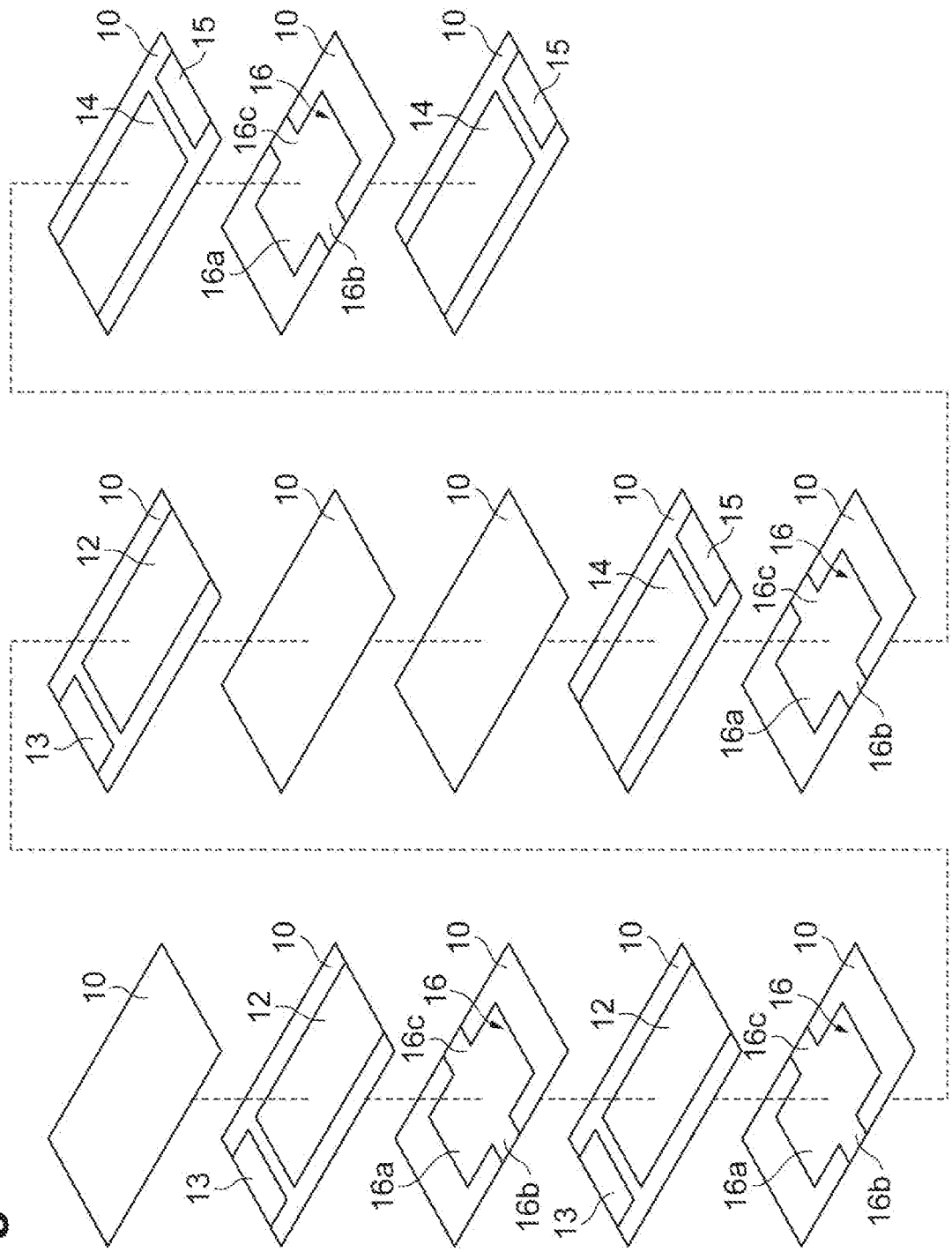
FIG. 3 is an exploded perspective view of a base body in a multilayer capacitor of the electronic component device illustrated in FIG. 1.

As illustrated in FIG. 3, each of the first inner electrodes 12 has a rectangular shape in which the second direction D2 is a long-side direction and the third direction D3 is a short-side direction. One end in the long-side direction of the first inner electrode 12 is exposed to one end surface 2a. The other end in the long-side direction of the first inner electrode 12 is positioned on one end surface 2a side of the other end surface 2b and is spaced apart from the other end surface 2b. The first inner electrode 12 is not exposed to the other end surface 2b, the pair of main surfaces 2c and 2d, and the pair of side surfaces 2e and 2f. An end portion of the first inner electrode 12 exposed to one end surface 2a is electrically connected to the first outer electrode 3.

Each of the first dummy electrodes 13 has a rectangular shape in which the second direction D2 is a short-side direction and the third direction D3 is a long-side direction. One end in the short-side direction of the first dummy electrode 13 is exposed to the other end surface 2b. The other end in the short-side direction of the first dummy electrode 13 is positioned on the other end surface 2b side of one end surface 2a and is spaced apart from one end surface 2a. The first inner electrode 12 and the first dummy electrode 13 are disposed with a predetermined distance therebetween in the second direction D2 (electrically insulated). An end portion of the first dummy electrode 13 exposed to the other end surface 2b is electrically connected to the second outer electrode 4.

As illustrated in FIG. 2, the plurality of second inner electrodes 14 are disposed in a region on the other main surface 2d side in the first direction D1 of the base body 2. In this embodiment, the plurality of second inner electrodes 14 are disposed in a region on the other main surface 2d side of the central portion in the first direction D1 of the base body 2.

As illustrated in FIG. 3, each of the second inner electrodes 14 has a rectangular shape in which the second direction D2 is a long-side direction and the third direction D3 is a short-side direction. One end of the second inner electrode 14 is exposed to the other end surface 2b. The other end in the long-side direction of the second inner electrode 14 is positioned on the other end surface 2b side of one end surface 2a and is spaced apart from one end surface 2a. The second inner electrode 14 is not exposed to one end surface 2a, the pair of main surfaces 2c and 2d, and the pair of side surfaces 2e and 2f. An end portion of the second inner electrode 14 exposed to the other end surface 2b is electrically connected to the second outer electrode 4.

Each of the second dummy electrodes 15 has a rectangular shape in which the second direction D2 is a short-side direction and the third direction D3 is a long-side direction. One end in the short-side direction of the second dummy electrode 15 is exposed to one end surface 2a. The other end in the short-side direction of the second dummy electrode 15 is positioned on one end surface 2a side of the other end surface 2b and is spaced apart from the other end surface 2b. The second inner electrode 14 and the second dummy electrode 15 are disposed with a predetermined distance therebetween in the second direction D2. An end portion of the second dummy electrode 15 exposed to one end surface 2a is electrically connected to the first outer electrode 3.

Each of the third inner electrodes 16 includes a main electrode portion 16a, and connecting portions 16b and 16c. The main electrode portion 16a faces the first inner electrode 12 or the second inner electrode 14 via a portion (dielectric layer 10) of the base body 2 in the first direction D1. The main electrode portion 16a has a rectangular shape in which the second direction D2 is a long-side direction and the third direction D3 is a short-side direction. The connecting portion 16b extends from one side (one long-side) of the main electrode portion 16a and is exposed to one side surface 2e. The connecting portion 16c extends from one side (the other long-side) of the main electrode portion 16a and is exposed to the other side surface 2f. The third inner electrode 16 is exposed to the pair of side surfaces 2e and 2f, and is not exposed to the pair of end surfaces 2a and 2b and the pair of main surfaces 2c and 2d. The main electrode portion 16a and the connecting portions 16b and 16c are integrally formed.

As illustrated in FIG. 1, the first outer electrode 3 is disposed on one end surface 2a side. The first outer electrode 3 includes an electrode portion 3a disposed on the end surface 2a, electrode portions 3b and 3c respectively disposed on the pair of main surfaces 2c and 2d, and electrode portions 3d and 3e respectively disposed on the pair of side surfaces 2e and 2f. The electrode portion 3a and the electrode portions 3b, 3c, 3d, and 3e are connected at edge line portions of the base body 2 and are electrically connected to each other. The first outer electrode 3 is formed on five surfaces of one end surface 2a, the pair of main surfaces 2c and 2d, and the pair of side surfaces 2e and 2f. The electrode portion 3a is disposed to cover all portions of the first inner electrodes 12 exposed to the end surface 2a, and the first inner electrodes 12 are directly connected to the first outer electrode 3.

The second outer electrode 4 is disposed on the other surface 2b side. The second outer electrode 4 includes an electrode portion 4a disposed on the end surface 2b, electrode portions 4b and 4c respectively disposed on the pair of main surfaces 2c and 2d, and electrode portions 4d and 4e respectively disposed on the pair of side surfaces 2e and 2f. The electrode portion 4a and the electrode portions 4b, 4c, 4d, and 4e are connected at edge line portions of the base body and are electrically connected to each other. The second outer electrode 4 is formed on live surfaces of one end surface 2b, the pair of main surfaces 2c and 2d, and the pair of side surfaces 2e and 2f. The electrode portion 4a is disposed to cover all portions of the second inner electrodes 14 exposed to the end surface 2b, and the second inner electrodes 14 are directly connected to the second outer electrode 4.

The first connecting conductor 5 is disposed at a central portion in the second direction D2 on one side surface 2e side. The first connecting conductor 5 includes an electrode portion 5a disposed on the side surface 2e, and electrode portions 5b and 5c respectively disposed on the pair of main surfaces 2c and 2d. The electrode portion 5a, and each of the electrode portion 5b and the electrode portion 5c are connected at edge line portions of the base body 2, and are electrically connected to each other. The first connecting conductor 5 is formed on three surfaces of the pair of main surfaces 2c and 2d, and one side surface 2e. When viewed from the third direction D3, an area of the electrode portion 5a is larger than areas of the electrode portion 3d of the first outer electrode 3 and the electrode portion 4d of the second outer electrode 4.

Figure 4:
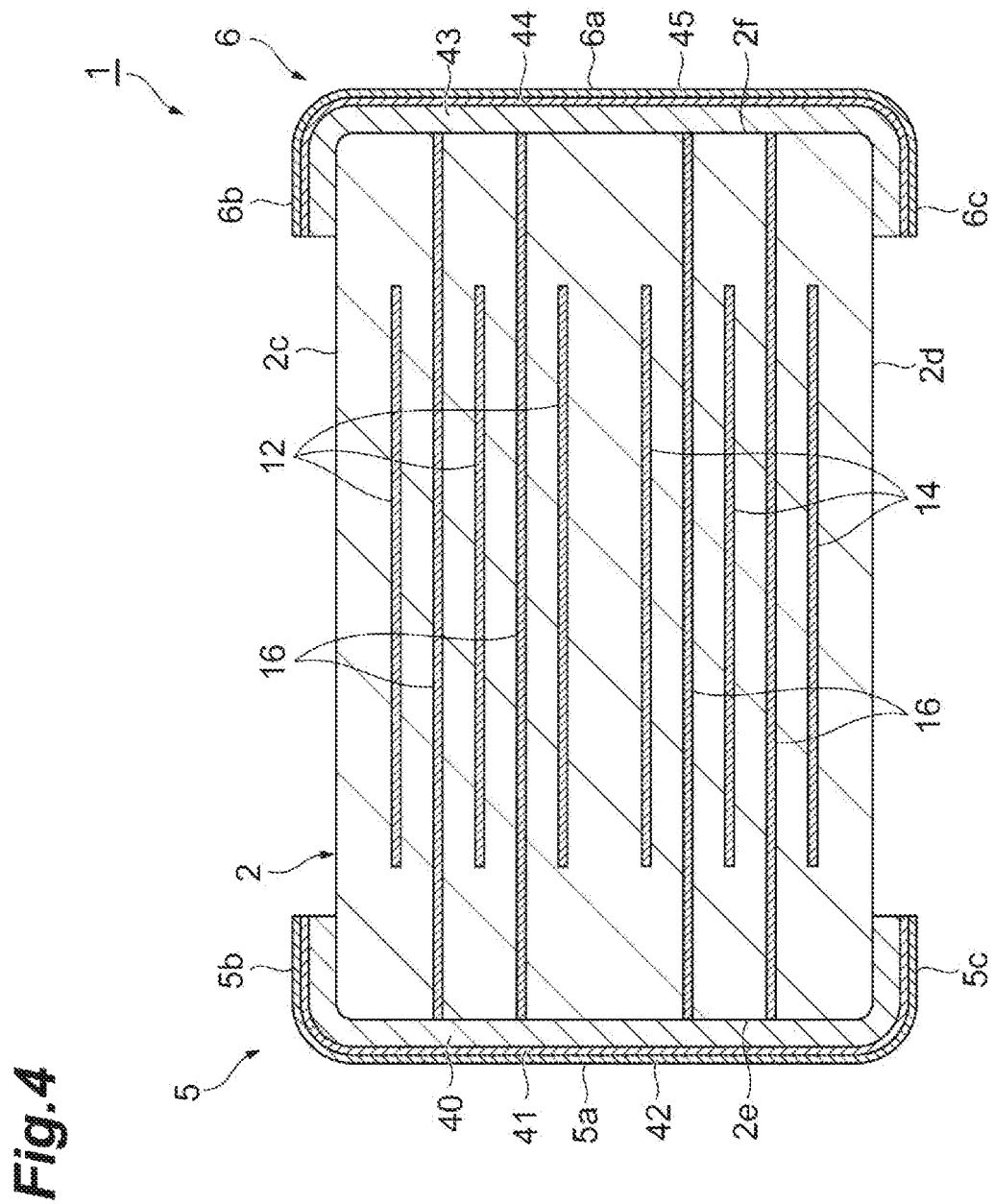
FIG. 4 is a view illustrating a cross-sectional configuration of the multilayer capacitor.

As illustrated in FIG. 4, the first connecting conductor 5 includes a baked electrode layer (baked metal layer) 40, a first plated layer 41, and a second plated layer 42. In the first connecting conductor 5, the baked electrode layer 40, the first plated layer 41 and the second plated layer 42 are disposed in this order from the base body 2 side. The baked electrode layer 40 contains a conductive material. The baked electrode layer 40 is formed as a sintered body of a conductive paste containing a conductive metal powder (for example, Ag powder) and a glass frit. The first plated layer 41 may be, for example, a Ni-plated layer. The second plated layer 42 may be, for example, a Sn-plated layer.

The electrode portion 5a is disposed to cover all portions of the connecting portions 16b of the third inner electrodes 16 exposed to the side surface 2e, and the connecting portions 16b are directly connected to the baked electrode layer 40 of the first connecting conductor 5. That is, the connecting portions 16b connect the main electrode portions 16a to the electrode portion 5a. Thereby, each of the third inner electrodes 16 is electrically connected to the first connecting conductor 5.

Figure 5:
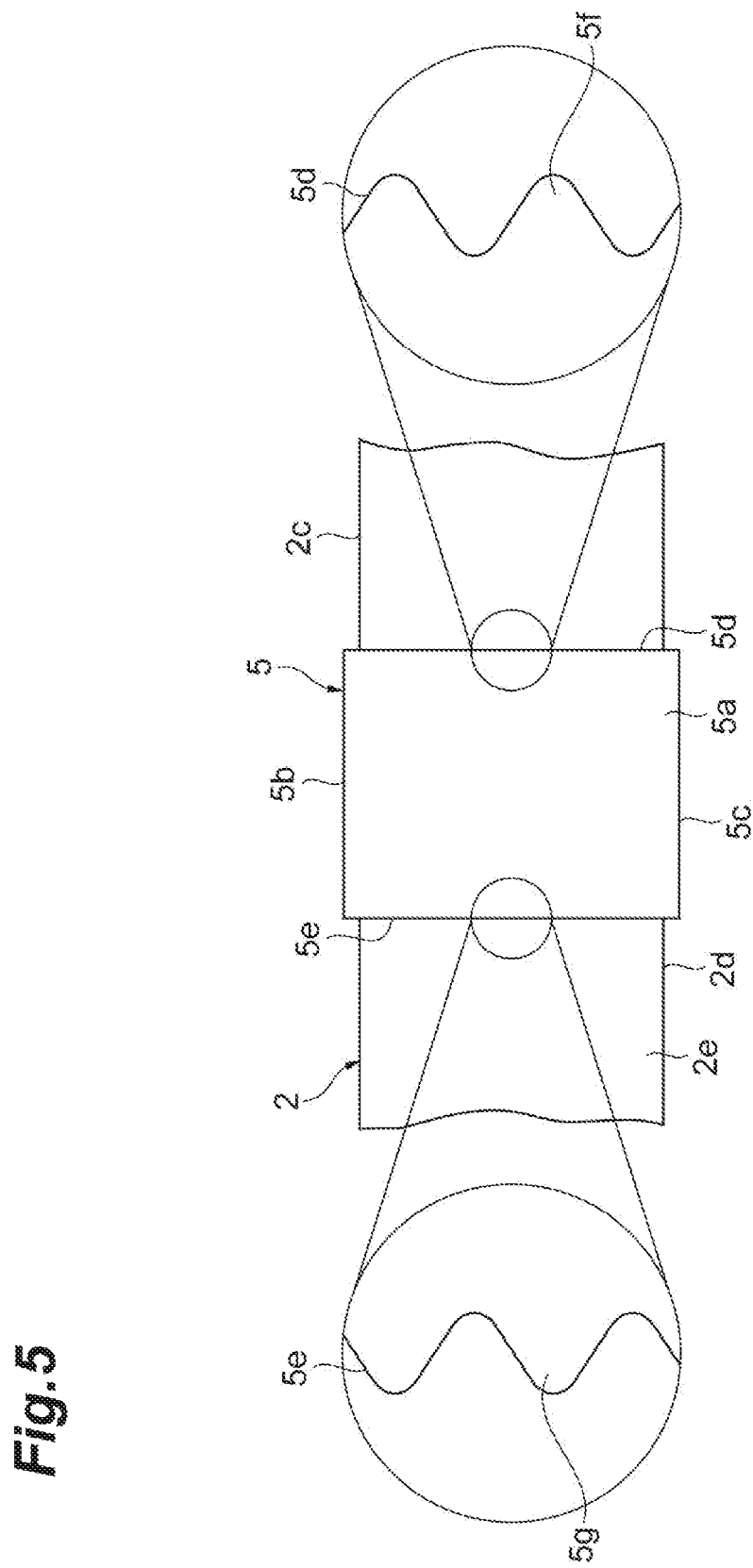
FIG. 5 is an enlarged view of a portion of a connecting conductor of the multilayer capacitor.

As illustrated in FIG. 5, uneven portions 5f and 5g are provided at edges 5d and 5e in the second direction D2 of the first connecting conductor 5. In this embodiment, the uneven portions 5f and 5g are formed to be continuous in the first direction D1 of the edges 5d and 5e.

As illustrated in FIG. 1, the second connecting conductor 6 is disposed at a central portion in the second direction D2 on the other side surface 2f side. The second connecting conductor 6 includes an electrode portion 6a disposed on the side surface 2f, and electrode portions 6b and 6c respectively disposed on the pair of main surfaces 2c and 2d. The electrode portion 6a, and each of the electrode portion 6b and the electrode portion 6c are connected at edge line portions of the base body 2, and are electrically connected to each other. The second connecting conductor 6 is formed on three surfaces of the pair of main surfaces 2c and 2d, and one side surface 2f. When viewed from the third direction D3, an area of the electrode portion 6a is larger than areas of the electrode portion 3e of the first outer electrode 3 and the electrode portion 4e of the second outer electrode 4.

As illustrated in FIG. 4, the second connecting conductor 6 includes a baked electrode layer (baked metal layer) 43, a first plated layer 44, and a second plated layer 45. In the second connecting conductor 6, the baked electrode layer 43, the first plated layer 44 and the second plated layer 45 are disposed in this order from the base body 2 side. The baked electrode layer 43 contains a conductive material. The baked electrode layer 43 is formed as a sintered body of a conductive paste containing a conductive metal powder (for example, Ag powder) and a glass frit. The first plated layer 44 may be, for example, a Ni-plated layer. The second plated layer 45 may be, for example, a Sn-plated layer.

The electrode portion 6a is disposed to cover all portions of the connecting portions 16c of the third inner electrodes 16 exposed to the side surface 2f, and the connecting portions 16c are directly connected to the baked electrode layer 43 of the second connecting conductor 6. That is, the connecting portions 16c connect the main electrode portions 16a to the electrode portion 6a. Thereby, each of the third inner electrodes 16 is electrically connected to the second connecting conductor.

Figure 6:
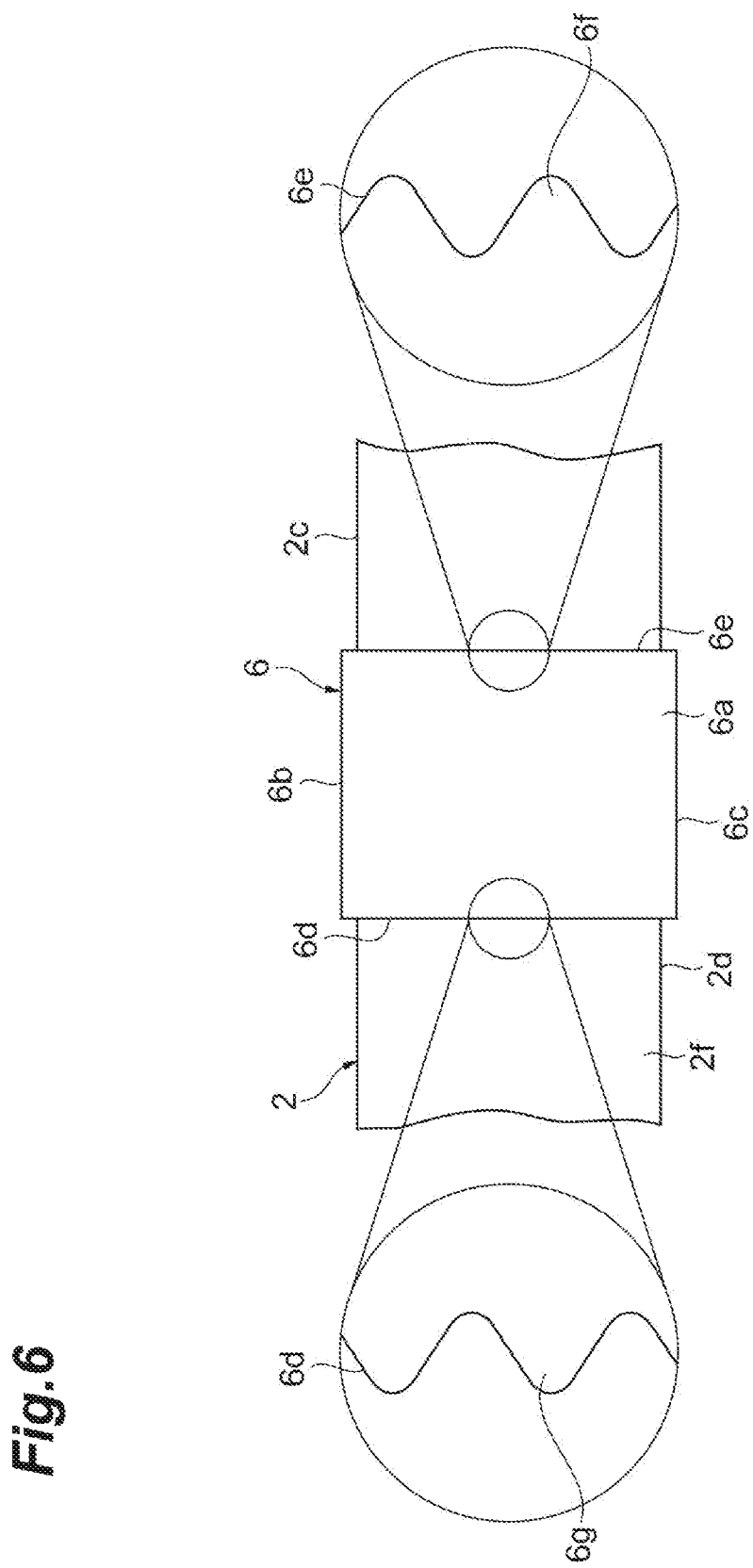
FIG. 6 is an enlarged view of a portion of a connecting conductor of the multilayer capacitor.

As illustrated in FIG. 6, uneven portions 6f and 6g are provided at edges 6d and 6e in the second direction D2 of the second connecting conductor 6. In this embodiment, the uneven portions 6f and 6g are formed to be continuous in the first direction D1 of the edges 6d and 6e.

Figure 7:
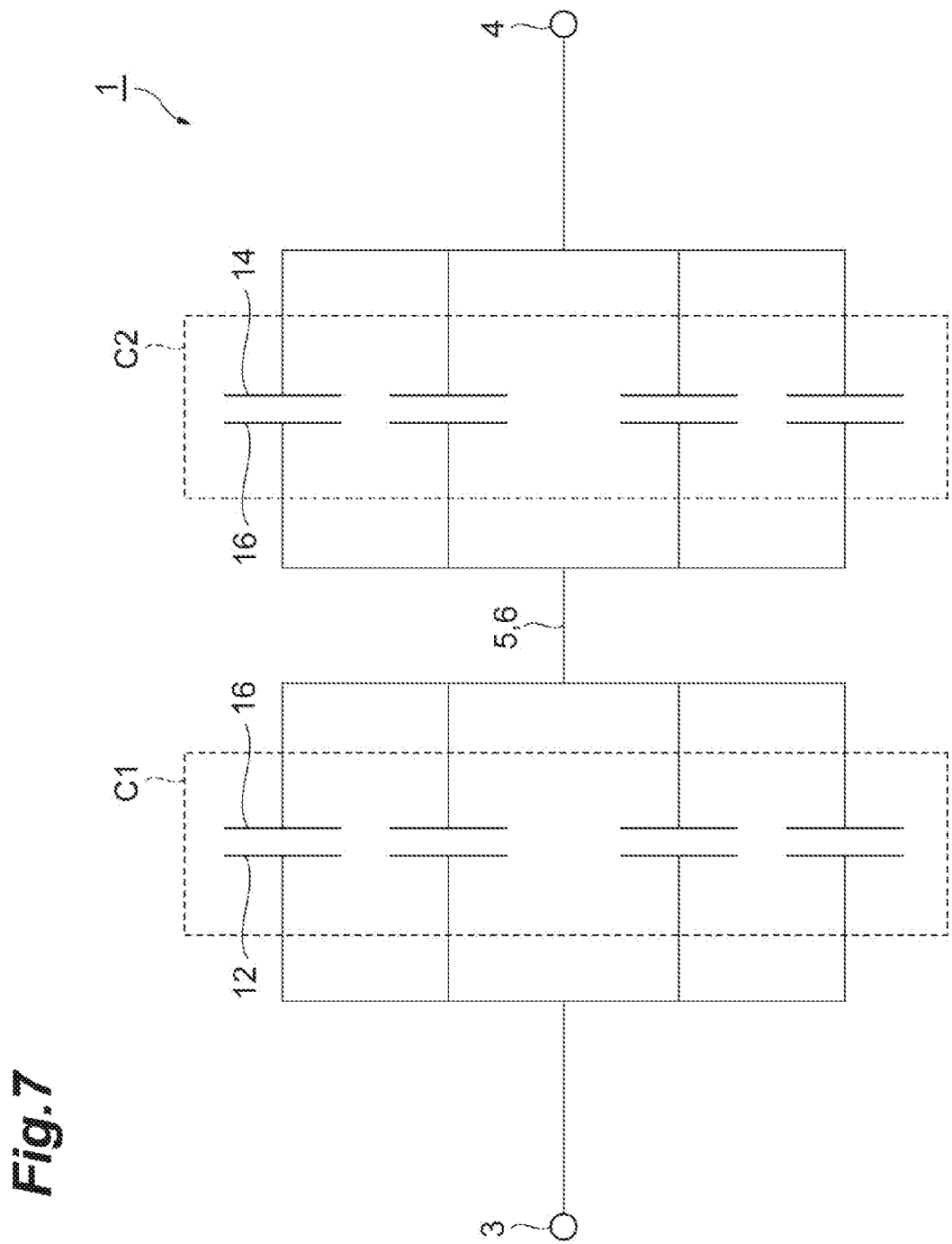
FIG. 7 is an equivalent circuit diagram of the multilayer capacitor.

As illustrated in FIG. 7, the multilayer capacitor 1 includes a first capacitance unit C1 and a second capacitance unit C1. The first capacitance unit C1 is constituted by the first inner electrodes 12 and the third inner electrodes 16 alternately arranged to face each other with a distance therebetween in the first direction D1 of the base body 2. In this embodiment, the first capacitance unit C1 is formed in a region on one main surface 2c side of a central portion in the first direction D1 of the base body 2. The first capacitance unit C1 constitutes a first capacitor component.

The second capacitance unit C2 is constituted by the second inner electrodes 14 and the third inner electrodes 16 alternately arranged to face each other with a distance therebetween in the first direction D1 of the base body 2. In this embodiment, the second capacitance unit C2 is formed in a region on the other main surface 2d side of the central portion in the first direction D1 of the base body 2. The second capacitance unit C2 constitutes a second capacitor component.

In the multilayer capacitor 1, a plurality of first capacitance units C1 are electrically connected in parallel, and a plurality of second capacitance units C2 are electrically connected in parallel. In the multilayer capacitor 1, the first capacitance units C1 and the second capacitance units C2 are electrically connected in series. Specifically, the first capacitance units C1 and the second capacitance units C2 are electrically connected in series by the plurality of third inner electrodes 16 electrically connected by the first connecting conductor 5 and the second connecting conductor 6. Further, the numbers of first capacitances unit C1 and second capacitance units C2 illustrated in FIG. 7 do not necessarily coincide with the numbers of first inner electrodes 12, second inner electrodes 14, and third inner electrodes 16 illustrated in FIG. 2.

As illustrated in FIGS. 1 and 2, the metal terminals 20 and 22 are electrically connected to the first outer electrode 3 and the second outer electrode 4, respectively. The metal terminal 20 is disposed to face the end surface 2a of the multilayer capacitor 1 (base body 2). The metal terminal 20 is electrically connected to the first outer electrode 3. The metal terminal 20 is electrically connected to the first inner electrodes 12 via the first outer electrode 3. The metal terminal 20 has an L shape.

The metal terminal 20 includes a connecting portion 24 and a leg portion 25. The connecting portion 24 and the leg portion 25 are plate members. The connecting portion 24 and the leg portion 25 are integrally formed. The connecting portion 24 has a surface facing the first outer electrode 3 (the end surface 2a of the base body 2). The electrode portion 3a disposed on the end surface 2a of the first outer electrode 3 is electrically connected to the connecting portion 24. The connecting portion 24 extends in the first direction D1 and has a rectangular shape when viewed from the second direction D2.

A protruding portion 24a is provided in the connecting portion 24. The protruding portion 24a is disposed at a position facing the first outer electrode 3. The protruding portion 24a protrudes from the connecting portion 24 toward the first outer electrode 3 (multilayer capacitor 1) side. The protruding portion 24a is provided on the main surface 2d side in the first direction D1 of the base body 2 of the multilayer capacitor 1. In this embodiment, the protruding portion 24a is formed by bending a portion of the connecting portion 24. Further, the protruding portion 24a may also be formed by disposing a separate member on the connecting portion 24. When forming the joint portion 30, the protruding portion 24a can inhibit a flow of a material forming the joint portion 30 out of a space between the connecting portion 24 and the first outer electrode 3.

The leg portion 25 extends in the second direction D2 from one end (lower end) 24b of the connecting portion 24, and has a rectangular shape when viewed from the first direction D1. The connecting portion 24 and the leg portion 25 extend in directions intersecting each other (in this embodiment, in directions perpendicular to each other). The leg portion 25 is connected to another electronic device (for example, a circuit board, an electronic component, or the like).

The metal terminal 22 is disposed to face the end surface 2b of the multilayer capacitor 1 (base body 2). The metal terminal 22 is electrically connected to the second outer electrode 4. The metal terminal 22 is electrically connected to the second inner electrodes 14 via the second outer electrode 4. The metal terminal 22 has an L shape.

The metal terminal 22 includes a correcting portion 26 and a leg portion 27. The connecting portion 26 and the leg portion 27 are plate members. The connecting portion 26 and the leg portion 27 are integrally formed. The connecting portion 26 has a surface facing the second outer electrode 4 (the end surface 2b of the base body 2). The electrode portion 4a disposed on the end surface 2b of the second outer electrode 4 is electrically connected to the connecting portion 26. The connecting portion 26 extends in the first direction D1 and has a rectangular shape when viewed from the second direction D2.

A protruding portion 26a is provided in the connecting portion 26. The protruding portion 26a is disposed at a position facing the second outer electrode 4. The protruding portion 26a protrudes from the connecting portion 26 toward the second outer electrode 4 (multilayer capacitor 1) side. The protruding portion 26a is provided on the main surface 2d side in the first direction D1 of the base body 2 of the multilayer capacitor 1. In this embodiment, the protruding portion 26a is formed by bending a portion of the connecting portion 26. Further, the protruding portion 26a may also be formed by disposing a separate member on the connecting portion 26. When the joint portion 32 is formed, the protruding portion 26a can inhibit a flow of a material forming the joint portion 32 out of a space between the connecting portion 26 and the second outer electrode 4.

The leg portion 27 extends in the second direction D2 from one end 26b of the connecting portion 26, and has a rectangular shape when viewed from the first direction D1. The connecting portion 26 and the leg portion 27 extend in a direction intersecting each other (in this embodiment, in a direction perpendicular to each other). The leg portion 27 is connected to another electronic device (for example, a circuit board, an electronic component, or the like).

The joint portion 30 joins the first outer electrode 3 and the metal terminal 20. In this embodiment, the electrode portion 3a of the first outer electrode 3 and the connecting portion 24 of the metal terminal 20 are joined by the joint portion 30. The joint portion 30 electrically connects the first outer electrode 3 to the metal terminal 20. In this embodiment, the joint portion 30 is disposed above the protruding portion 24a.

The joint portion 30 is formed of a conductive adhesive in which the conductive filler is formed of Ag. Therefore, the joint portion 30 contains a noble metal as a main component. In this embodiment, the joint portion 30 contains Ag as a main component. The joint portion 30 may also contain a noble metal other than Ag as the main component.

In this embodiment, the joint portion 30 is formed of a resin (for example, a thermosetting resin or the like) and a conductive filler formed of Ag. As the thermosetting resin, for example, a phenol resin, an acrylic resin a silicone resin, an epoxy resin, a polyimide resin, or the like may be used. The joint portion 30 is also a conductive resin layer. Further, the joint portion 30 may also be a solder or the like.

The joint portion 32 joins the second outer electrode 4 and the metal terminal 22. In this embodiment, the electrode portion 4a of the second outer electrode 4 and the connecting portion 26 of the metal terminal 22 are joined by the joint portion 32. The joint portion 32 electrically connects the second outer electrode 4 to the metal terminal 22. The joint portion 32 is disposed above the protruding portion 26a.

As described above, in the electronic component device 100 according to this embodiment, the multilayer capacitor 1 includes the first connecting conductor 5 and the second connecting conductor 6 disposed on the pair of side surfaces 2e and 2f of the base body 2, first connecting conductor 5 and the second connecting conductor 6 include the baked electrode layers 40 and 43. Generally, the baked electrode layers 40 and 43 are harder than the base body 2, and have a higher rigidity than the base body 2. Also, since the first connecting conductor 5 and the second connecting conductor 6 include the baked electrode layers 40 and 43, adhesion of the first connecting conductor 5 and the second connecting conductor 6 to the base body 2 can be secured. When the first connecting conductor 5 and the second connecting conductor 6 are disposed on the side surfaces 2e and 2f of the base body 2, even when bending occurs in the circuit board, occurrence of bending in the multilayer capacitor 1 of the electronic component device 100 mounted on a circuit board can be inhibited by the rigidity of the first connecting conductor 5 and the second connecting conductor 6. Therefore, occurrence of bending in the base body 2 of the multilayer capacitor 1 can be inhibited. As a result, occurrence of cracks in the base body 2 of the multilayer capacitor 1 can be inhibited in the electronic component device 100.

In the electronic component device 100 according to this embodiment, the multilayer capacitor 1 includes the first inner electrodes 12 electrically connected to the first outer electrode 3, the second inner electrodes 14 electrically connected to the second outer electrode 4, and a plurality of third inner electrodes 16. The plurality of third inner electrodes 16 are connected to the baked electrode layer 40 of the first connecting conductor 5 and the baked electrode layer 43 of the second connecting conductor 6. In this configuration, since the plurality of third inner electrodes 16 are connected to the baked electrode layers 40 and 43 of the first connecting conductor and the second connecting conductor 6, strengths of the first connecting conductor 5 and the second connecting conductor 6 can be increased, and a rigidity of the first connecting conductor 5 and the second connecting conductor 6 can be further increased. Therefore, in the electronic component device 100, it is possible to further inhibit occurrence of bending in the base body 2 of the multilayer capacitor 1. As a result, occurrence of cracks in the base body 2 of the multilayer capacitor 1 can be inhibited in the electronic component device 100.

In the multilayer capacitor 1 of the electronic component device 100 according to this embodiment, the first capacitance unit C1 is constituted by the first inner electrode 12 and the third inner electrode 16, and the second capacitance unit C2 is constituted by the second inner electrode 14 and the third inner electrode 16. In the multilayer capacitor 1, the plurality of third inner electrodes 16 are electrically connected by the first connecting conductor 5 and the second connecting conductor 6. Thereby, the first capacitance unit C1 and the second capacitance unit C2 are electrically connected in series. Therefore, for example, when a problem occurs in one of the capacitance units, changes occur in electrostatic capacitance and a resistance value. Therefore, in the electronic component device 100, even when a problem occurs in the multilayer capacitor 1 after having mounted, the problem can be detected.

In the multilayer capacitor 1 of the electronic component device 100 according to this embodiment, the first inner electrodes 12 are disposed on one main surface 2c side in the base body 2, the second inner electrodes 14 are disposed on the other main surface 2d side in the base body 2, and the third inner electrodes 16 are disposed to respectively face, the first inner electrodes 12 and the second inner electrodes 14. In this configuration, the first capacitance unit C1 is formed in a region on one main surface 2c side, and the second capacitance unit C2 is formed in a region on the other main surface 2d side. Therefore, in the multilayer capacitor 1, even when cracks occur in the base body 2 from both sides of the first outer electrode 3 and the second outer electrode 4, for example, the second inner electrodes 14 may be broken, but breakage of the first inner electrodes 12 can be avoided. Therefore, it is possible to protect the first capacitance unit C1 in the multilayer capacitor 1. As described above, in the multilayer capacitor 1, even when cracks occur in the base body 2, a portion of the capacitance units can be protected.

In the multilayer capacitor 1 of the electronic component device 100 according to this embodiment, the first outer electrode 3 and the second outer electrode 4 respectively include the electrode portions 3d and 4d, and, 3e and 4e respectively disposed on the side surfaces 2e and 2f. Areas of the first connecting conductor 5 and the second connecting conductor 6 disposed on the side surfaces 2e and 2f are respectively larger than areas of the electrode portions 3d and 4d, and, 3e and 4e. With this configuration, a strength of the first connecting conductor 5 and the second connecting conductor 6 can be increased, and a rigidity of the first connecting conductor 5 and the second connecting conductor 6 can be further increased. Therefore, it is possible to further inhibit occurrence of bending in the base body 2 of the multilayer capacitor 1. Therefore, in the electronic component device 100, occurrence of cracks in the base body 2 of the multilayer capacitor 1 can be further inhibited.

In the multilayer capacitor 1 of the electronic component device 100 according to this embodiment, the uneven portions 5f and 5g, and, 6f and 6g are respectively provided at the edges 5d and 5e, and, 6d and 6e in the second direction D2 of the first connecting conductor 5 and the second connecting conductor 6. With this configuration, when bending is inhibited by the first connecting conductor 5 and the second connecting conductor 6, a stress generated in the first connecting conductor 5 and the second connecting conductor 6 can be alleviated at the uneven portions 5f and 5g, and, 6f and 6g. Therefore, a stress applied to the base body 2 can be inhibited. As a result, in the electronic component device 100, occurrence of cracks in the base body 2 of the multilayer capacitor 1 can be further inhibited.

In the above-described embodiment, a configuration in which the plurality of first inner electrodes 12 are disposed in a region on the main surface 2c side and the plurality of second inner electrodes 14 are disposed in a region on the main surface 2d side has been described as an example. That is, a configuration in which the first capacitance unit C1 is funned in a region on the main surface 2c side and the second capacitance unit C2 is formed in a region on the main surface 2d side has been described as an example. However, the plurality of first inner electrodes 12 may be disposed m a region on the main surface 2d side and the plurality of second inner electrodes 14 may be disposed in a region on the main surface 2c side.

Second Embodiment

Figure 8:
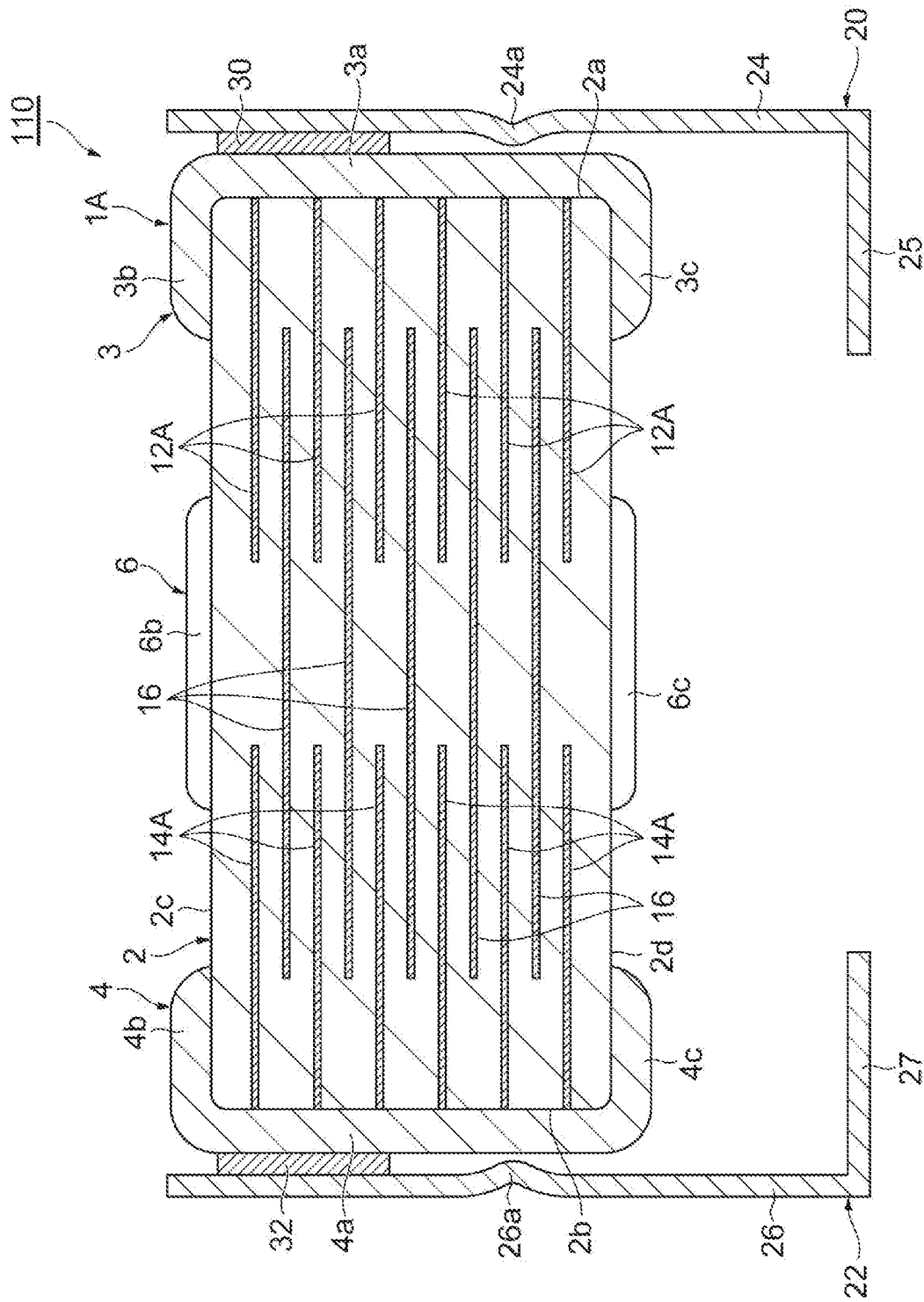
FIG. 8 is a view illustrating a cross-sectional configuration of an electronic component device according to a second embodiment.

As illustrated in FIG. 8, an electronic component device 110 according to a second embodiment includes a multilayer capacitor 1A, metal terminals 20 and 22, and joint portions 30 and 32. The metal terminals 20 and 22 and the joint portions 30 and 32 have the same configuration as those of the first embodiment.

The multilayer capacitor 1A includes a base body 2, and a first outer electrode 3, a second outer electrode 4, a first connecting conductor 5 (see FIG. 1), and a second connecting conductor 6 which are disposed on outer surfaces of the base body 2.

The multilayer capacitor 1A includes, as inner conductors disposed in the base body 2, a plurality of first inner electrodes 12A, a plurality of second inner electrodes 14A, and a plurality of third inner electrodes 16. In this embodiment, the number of the plurality of first inner electrodes 12A (here, six) is the same as the number of the plurality of second inner electrodes 14A.

The first inner electrodes 12A and the second inner electrodes 14A are disposed at the same positions (layers) in a first direction D1 of the base body 2. The first inner electrodes 12A and the second inner electrodes 14A are arranged alternately with the third inner electrodes 16 to face each other in the base body 2 with a distance therebetween in the first direction D1.

The plurality of first inner electrodes 12A are arranged in a region on one end surface 2a side in a second direction D2 of the base body 2. In this embodiment, the plurality of first inner electrodes 12A are arranged in a region on one end surface 2a side of a central portion in the second direction D2 of the base body 2.

Figure 9:
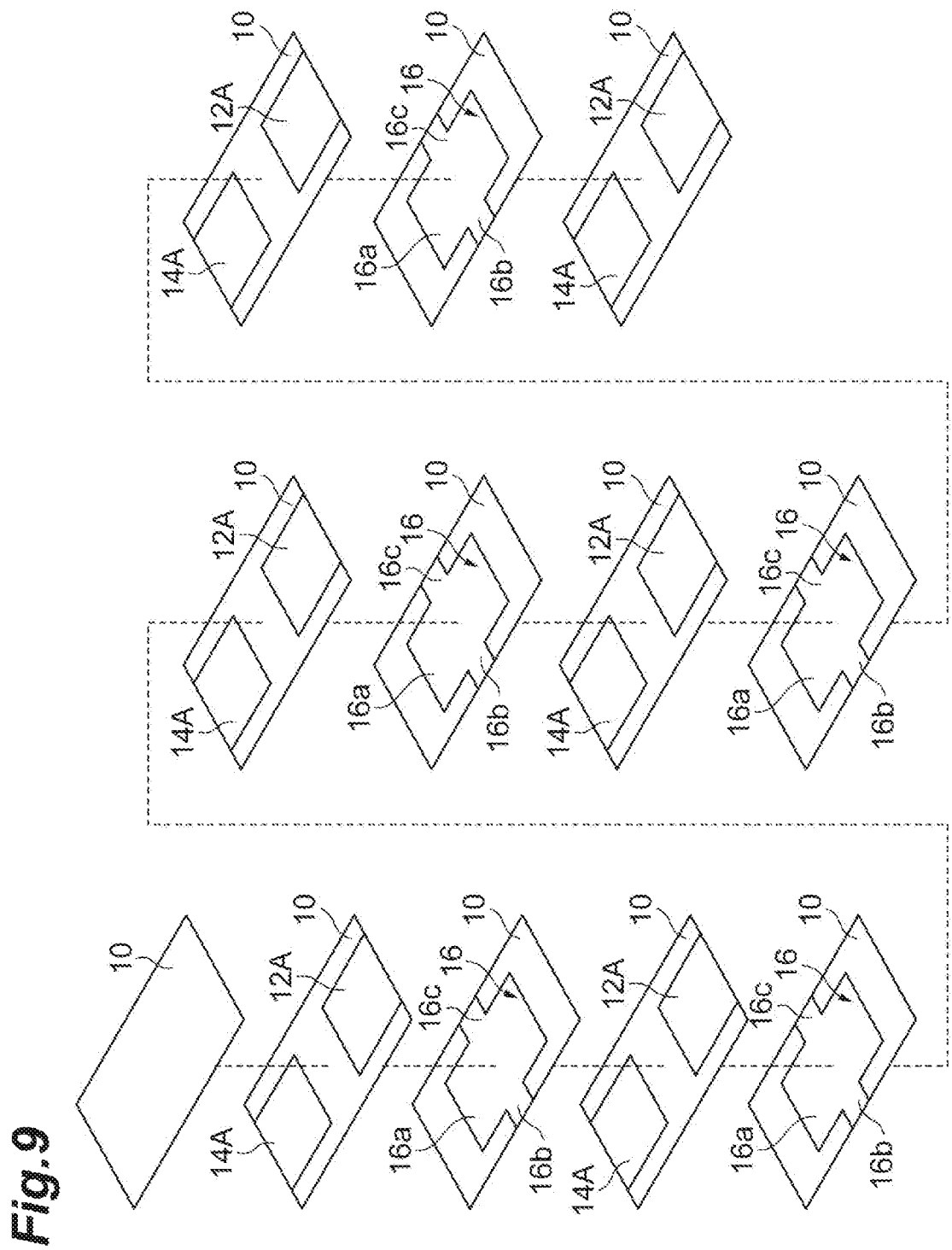
FIG. 9 is an exploded perspective view of a base body in a multilayer capacitor of an electronic component device illustrated in FIG. 8.

As illustrated in FIG. 9, one end of each of the first inner electrodes 12A is exposed to one end surface 2a. The other end of the first inner electrode 12 is spaced apart from the other end of the second inner electrode 14A at a predetermined distance. The first inner electrode 12 is not exposed to the other end surface 2b, a pair of main surfaces 2c and 2d, and a pair of side surfaces 2e and 2f. The end portion of the first inner electrode 12 exposed to one end surface 2a is electrically connected to the first outer electrode 3.

The plurality of second inner electrodes 14A are arranged in a region on the other end surface 2b side in the second direction D2 of the base body 2. In this embodiment, the plurality of second inner electrodes 14A are arranged in a region on the other end surface 2b side of the central portion in the second direction D2 of the base body 2. In this embodiment, each of the second it electrodes 142 has the same shape as that of the first inner electrode 12A, and has the same size.

One end of the second inner electrode 14A is exposed to the other end surface 2b. The other end of the second inner electrode 14A is spaced apart from the other end of the first inner electrode 12A at a predetermined distance. The second inner electrode 14A is not exposed to one end surface 2a, the pair of main surfaces 2c and 2d, and the pair of side surfaces 2e and 2f. An end portion of the second inner electrode 14 exposed to the other end surface 2b is electrically connected to the second outer electrode 4.

Each of the third inner electrodes 16 includes a main electrode portion 16a and connecting portions 16b and 16c. The main electrode portion 16a faces each of the first inner electrode 12 and the second inner electrode 14 with a portion (dielectric layer 10) of the base body 2 interposed therebetween in the first direction D1.

Figure 10:
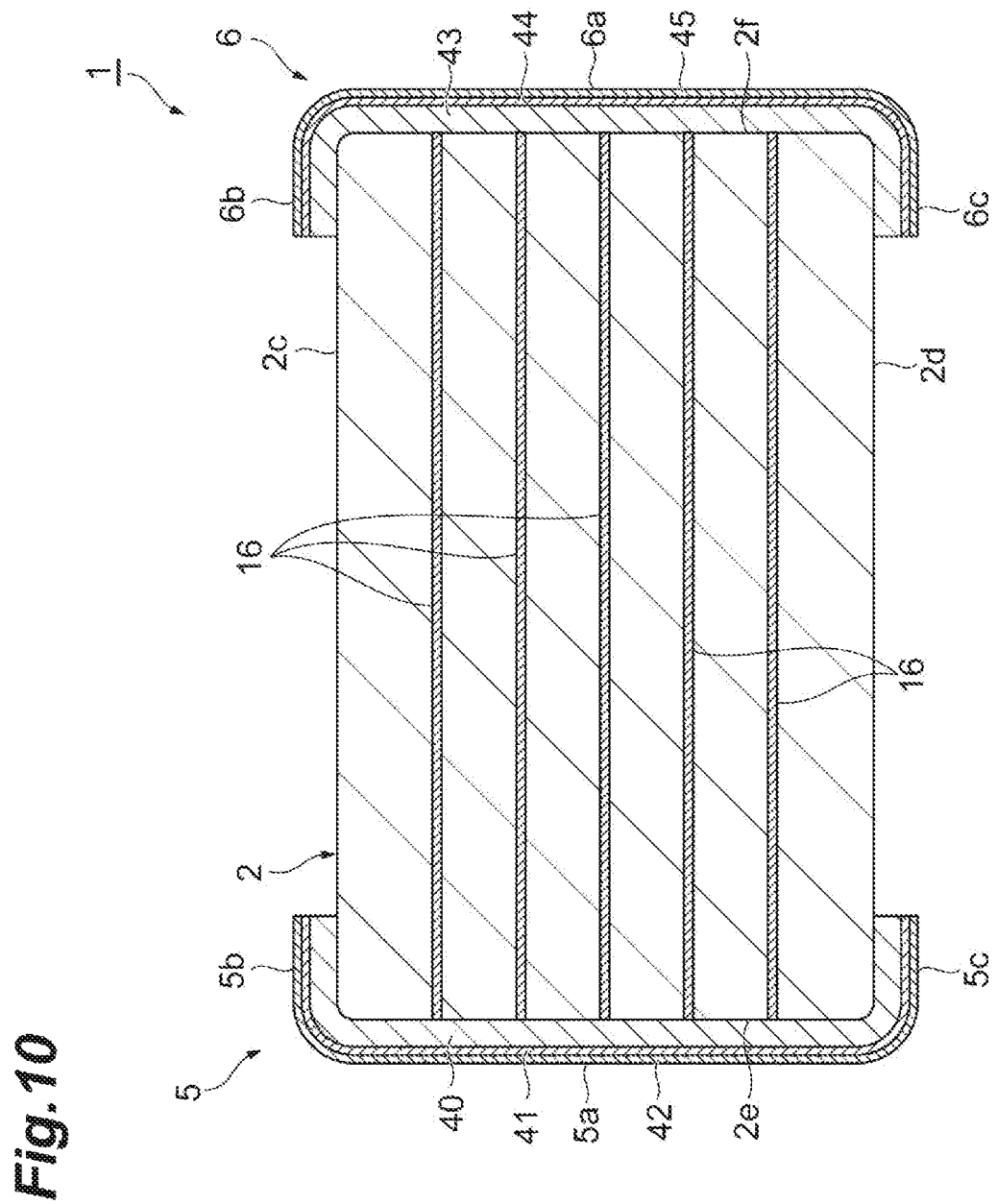
FIG. 10 is a view illustrating a cross-sectional configuration of the multilayer capacitor.

As illustrated in FIG. 10, the first connecting conductor 5 includes a baked electrode layer (baked metal layer) 40, a first plated layer 41, and a second plated layer 42. The second connecting conductor 6 includes a baked electrode layer (baked metal layer) 43, a first plated layer 44, and a second plated layer 45. As illustrated in FIG. 5, uneven portions 5f and 5g are provided at edges 5d and 5e of the first connecting conductor, 5 in the second direction D2, In this embodiment, the uneven portions 5f and 5g are formed to be continuous in the first direction D1 of the edges 5d and 5c. As illustrated in FIG. 6, uneven portions 6f and 6g are provided at edges 6d and 6e of the second connecting conductor 6 in the second direction D2. In this embodiment, the uneven portions 6f and 6g are formed to be continuous in the first direction D1 of the edges 6d and 6e.

Figure 11:
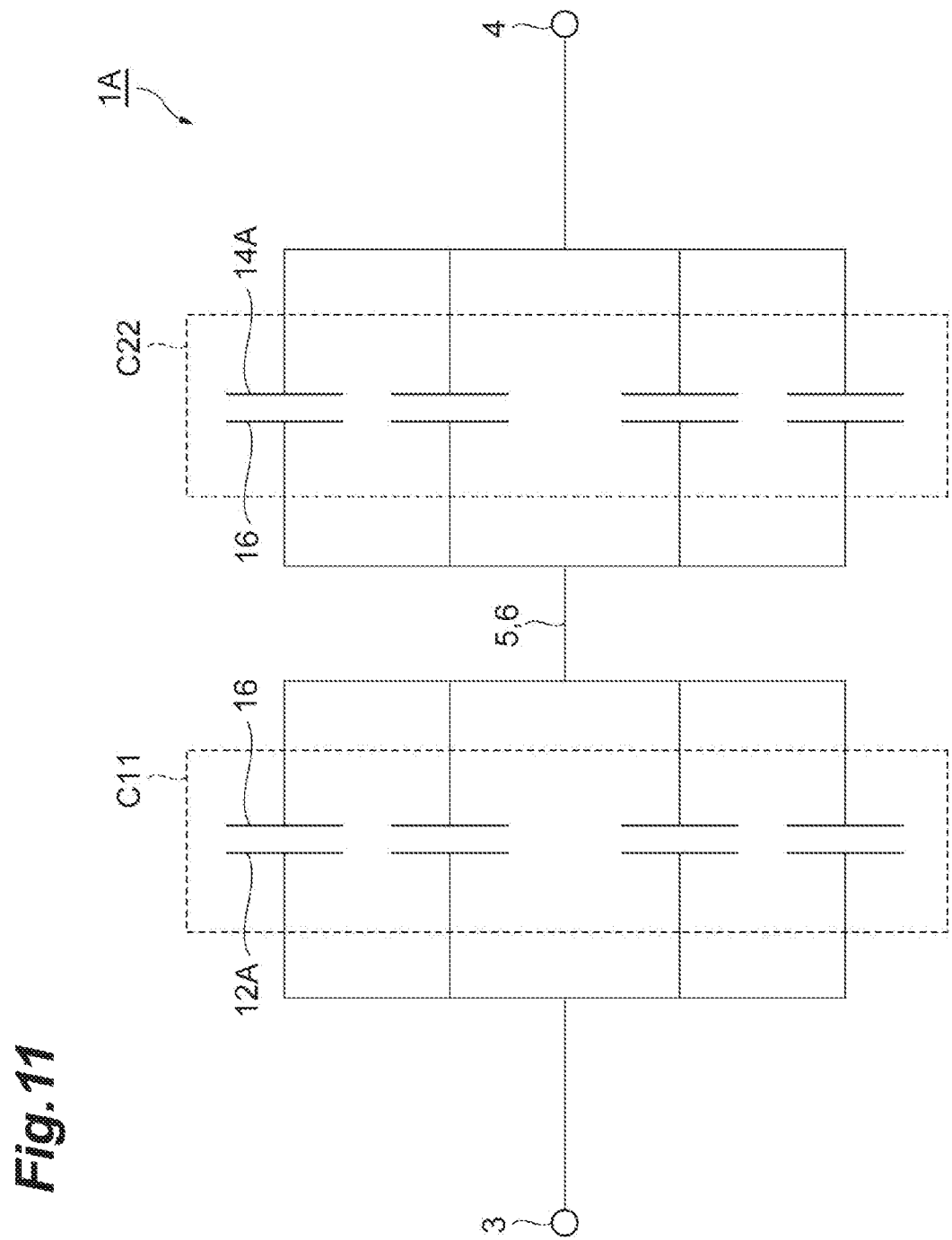
FIG. 11 is an equivalent circuit diagram of the multilayer capacitor.

As illustrated in FIG. 11, the multilayer capacitor 1A includes a first capacitance unit C11 and a second capacitance unit C22. The first capacitance unit C11 is constituted by the first inner electrode 12A and the third inner electrode 16 alternately arranged to face each other in the base body 2 with a distance therebetween in the first direction D1. In this embodiment, the first capacitance unit C11 is formed in a region on one end surface 2a side of a central portion in the second direction D2 of the base body 2. The first capacitance unit C11 constitutes a first capacitor component.

The second capacitance unit C22 is constituted by the second inner electrode 14A and the third inner electrode 16 alternately arranged to face each other in the base body 2 with a distance therebetween in the first direction D1. In this embodiment, the second capacitance unit C22 is formed in a region on the other end surface 2b side of the central portion in the second direction D2 of the base body 2. The second capacitance unit C22 constitutes a second capacitor component.

In the multilayer capacitor 1A, a plurality of first capacitance units C11 are electrically connected in parallel, and a plurality of second capacitance units C22 are electrically connected in parallel. In the multilayer capacitor 1A, the first capacitance unit C11 and the second capacitance unit C22 are electrically connected in series. Specifically, the first capacitance unit C11 and the second capacitance unit C22 are electrically connected in series by the plurality of third inner electrodes 16 electrically connected by the first connecting conductor 5 and the second connecting conductor 6. Further, the numbers of first capacitance units C11 and second capacitance units C22 illustrated in FIG. 11 do not necessarily coincide with the numbers of first inner electrodes 12A, second inner electrodes 14A, and third inner electrodes 16 illustrated in FIG. 8.

As described above, in the electronic component device 110 according to this embodiment, the multilayer capacitor 1A includes the first connecting conductor 5 and the second connecting conductor 6 disposed on the pair of side surfaces 2e and 2f of the base body 2. The first connecting conductor 5 and the second connecting conductor 6 include the baked electrode layers 40 and 43. Generally, the baked electrode layers 40 and 43 are harder than the base body 2. Also, since the first connecting conductor 5 and the second connecting conductor 6 include the baked electrode layers 40 and 43, adhesion of the first connecting conductor 5 and the second connecting conductor 6 to the base body 2 can be secured. Therefore, when the first connecting conductor 5 and the second connecting conductor 6 are disposed on the pair of side surfaces 2e and 2f of the base body 2, occurrence of bending in the base body 2 can be inhibited due to the first connecting conductor 5 and the second connecting conductor 6. Therefore, occurrence of cracks in the base body 2 of the multilayer capacitor 1A can be inhibited in the electronic component device 110.

In the multilayer capacitor 1A of the electronic component device 110 according to this embodiment, the first capacitance unit C11 is constituted by the first inner electrode 12A and the third inner electrode 16, and the second capacitance unit C22 is constituted by the second inner electrode 14A and the third inner electrode 16. In the multilayer capacitor 1A, the plurality of third inner electrodes 16 are electrically connected by the first connecting conductor 5 and the second connecting conductor 6. Thereby, the first capacitance unit C11 and the second capacitance unit C22 are electrically connected in series. Therefore, for example, when a problem occurs in one of the capacitance units, changes occur in electrostatic capacitance and a resistance value. Therefore, in the electronic component device 110, even when a problem occurs in the multilayer capacitor 1A after having mounted, the problem can be detected.

Also, in the multilayer capacitor 1A of the electronic component device 110, the first capacitance unit C11 is formed in a region on one end suffice 2a side and the second capacitance unit C22 is formed in a region on the other end surface 2b side. Therefore, in the multilayer capacitor 1A, even when cracks occur in the base body 2 from the main surfaces 2c and 2d side due to bending of the base body 2, for example, the second inner electrodes 14A disposed on the other end surface 2b side may be broken, but breakage of the first inner electrodes 12A disposed on one end surface 2a side can be avoided. Therefore, it is possible to protect the first capacitance unit C11 in the multilayer capacitor 1A. As described above, in the electronic component device 110, even when cracks occur in the base body 2 of the multilayer capacitor 1A, a portion of the capacitance units can be protected.

While embodiments of the invention have been described above, the invention is not necessarily limited to the above-described embodiments, and various modifications can be made without departing from the gist of the invention.

In the above embodiments, a configuration in which the electronic component is a multilayer capacitor has been described as an example. However, the electronic component is not limited to a multilayer capacitor.

In the above embodiments, a configuration in which the plurality of inner electrodes include the first inner electrodes 12 (12A), the second inner electrodes 14 (14A) and the third inner electrode 16, the first capacitance unit C1 (C11) is constituted by the first inner electrode 12 (12A) and the third inner electrode 16, and the second capacitance unit C2 (C22) is constituted by the second inner electrode 14 (14A) and the third inner electrode 16 has been described as an example. However, in a multilayer capacitor (electronic component), one capacitance unit may be constituted by two inner electrodes alternately laminated. Also, the inner conductors are not limited to inner electrodes.

In the above embodiments, a configuration in which the third inner electrodes are connected to the first connecting conductor 5 and the second connecting conductor 6 which are metal portions has been described as an example. However, the inner electrodes may not be connected to the metal portions. In this case, the plurality of third inner electrodes 16 may be connected by via conductors.

In the above embodiments, a configuration in which the first connecting conductor 5 has the baked electrode layer 40 and the second connecting conductor 6 has the baked electrode layer 43 has been described as an example. However, the connecting conductor (metal portion) may have a plurality of baked electrode layers (baked metal layers).

In the above embodiments, a configuration in which the first connecting conductor 5 includes the electrode portion 5a disposed on the side surface 2e, and the electrode portions 5b and 5c respectively disposed on the pair of main surfaces 2c and 2d has been described as an example. However, the first connecting conductor 5 may have the electrode portion 5a at a minimum. Similarly, the second connecting conductor 6 may have the electrode portion 6a at a minimum.

In the above embodiments, a configuration in which the first connecting conductor 5 and the second connecting conductor 6 are respectively disposed on each of the pair of side surfaces 2e and 2f of the base body 2 has been described as an example. However, the connecting conductor (metal portion) may be disposed on one side surface of the pair of side surfaces 2e and 2f. Also, the connecting conductor may be disposed on at least one of the pair of main surfaces 2c and 2d. The connecting conductor may be disposed on at least one surface of the pair of main surfaces 2c and 2d and the pair of side surfaces 2e and 2f.

Figure 12:
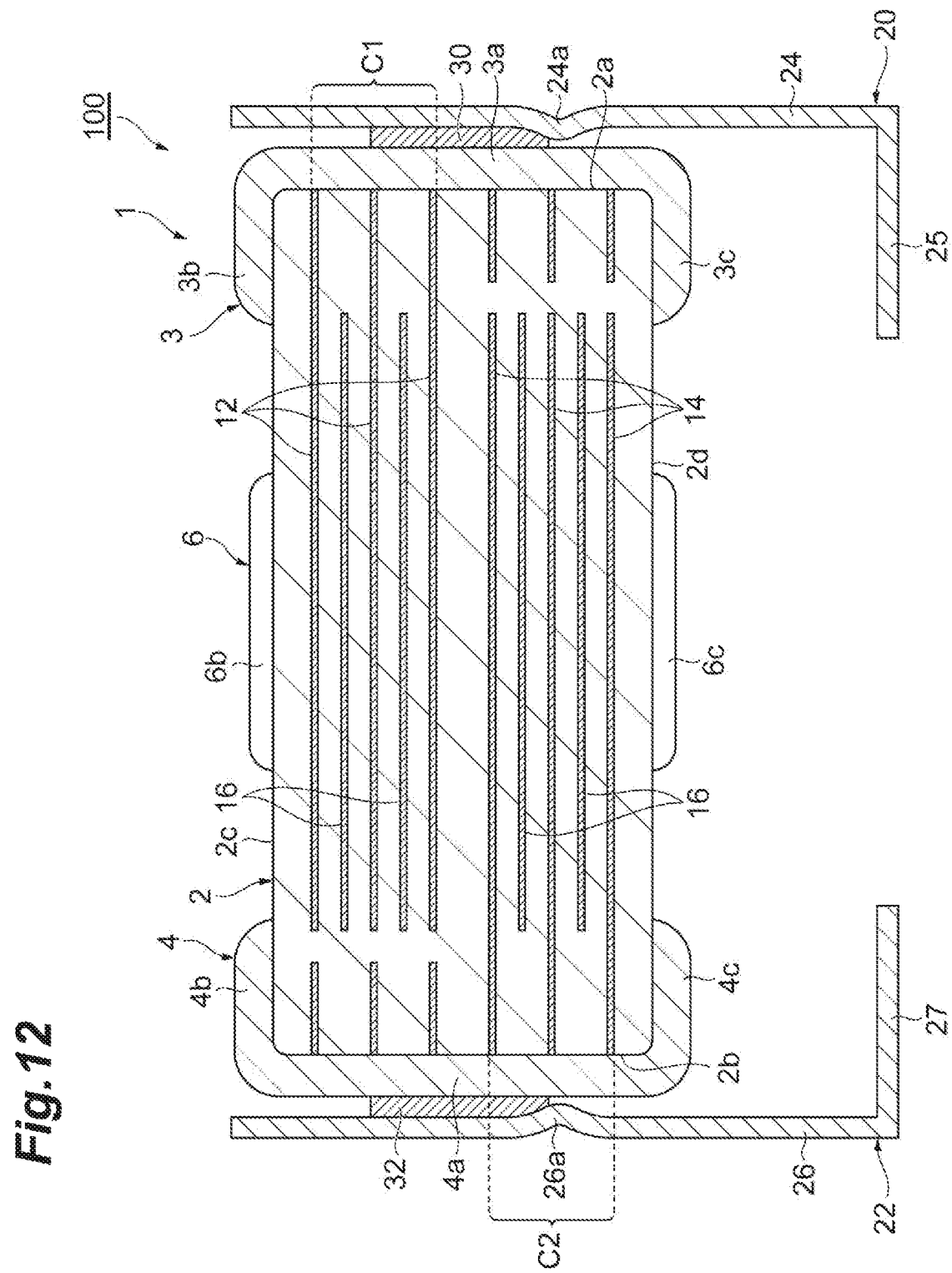
FIG. 12 is a view illustrating a cross-sectional configuration of an electronic component device according to a modified example.

In the above embodiments, a configuration in which the joint portion 30 is disposed above the protruding portion 24a, and the joint portion 32 is disposed above the protruding portion 26a has been described as an example. However, as illustrated in FIG. 12, the joint portion 30 may be disposed such that a portion thereof is disposed on the protruding portion 24a. Similarly, the joint portion 32 may be disposed such that a portion thereof is disposed on the protruding portion 26a.

In the above embodiments, a configuration in which the protruding portions 24a and 26a are provided on the connecting portions 24 and 26 of the metal terminals 20 and 22 has been described as an example. However, the protruding portion may not be provided on the connecting portion.

In the above embodiments, a configuration in which the first outer electrode 3 includes the electrode portions 3a to 3e has been described as an example. However, the first outer electrode 3 may have the electrode portion 3a at a minimum. Similarly, the second outer electrode 4 may have the electrode portion 4a at a minimum.

In the above embodiments, a case in which the first inner electrodes 12 and 12A, the second inner electrodes 14 and 14A, and the third inner electrode 16 are perpendicular to the side surfaces 2e and 2f of the base body 2 and extend in a direction in which the pair of end surfaces 2a and 2b are facing each other has been described as an example. In other words, a configuration in which a direction in which the dielectric layers 10 are laminated is a direction in which the pair of main surfaces 2c and 2d are facing each other has been described as an example. However the first inner electrodes, the second inner electrodes, and the third inner electrodes may be perpendicular to the main surfaces 2c and 2d of the base body 2 and extend in a direction in which the pair of end surfaces 2a and 2b face each other.

What is claimed is:
1. An electronic component device comprising:
an electronic component including:
a base body having a pair of end surfaces facing each other in a first direction, first and second main surfaces facing each other in a second direction, and first and second side surfaces facing each other in a third direction;
a first connecting conductor and a second connecting conductor, a majority of the first connecting conductor being on the first side surface, and a majority of the second connecting conductor being on the second side surface, each of the first connecting conductor and second connecting conductor having a baked metal layer;
a first outer electrode on a first of the pair of end surfaces and a second outer electrode on a second of the pair of end surfaces; and
an inner conductor in the base body and including:
at least one first inner electrode electrically connected to the first outer electrode and in a first half of the electronic component on a first main surface side;
at least one second inner electrode electrically connected to the second outer electrode and in a second half of the electronic component on a second main surface side;
at least one primary third inner electrode that faces the at least one first inner electrode, is electrically connected to the baked metal layers of the first connecting conductor and second connecting conductor, and includes a first connection portion connecting to the first connecting conductor and a second connection portion connecting to the second connecting conductor; and
at least one secondary third inner electrode that faces the at least one second inner electrode, is electrically connected to the baked metal layers of the first connecting conductor and second connecting conductor, and includes a first connection portion connecting to the first connecting conductor and a second connection portion connecting to the second connecting conductor;
a first metal terminal electrically connected to the first outer electrode and a second metal terminal electrically connected to the second outer electrode;

a first joint portion joining and electrically connecting the first outer electrode to the first metal terminal and a second joint portion joining and electrically connecting the second outer electrode to the second metal terminal;

a first capacitor formed by the at least one first inner electrode and the at least one primary third inner electrode, the first capacitor being in the first half of the electronic component; and a second capacitor formed by the at least one second inner electrode and the at least one secondary third inner electrode, the second capacitor being in the second half of the electronic component, wherein the first capacitor and the second capacitor are connected in series, none of the at least one first inner electrode is in the second half of the electronic component, and none of the at least one second inner electrode is in the first half of the electronic component, only the at least one first inner electrode, the at least one second inner electrode, the at least one primary third inner electrode, and the at least one secondary third inner electrode are internal conductors of the base body that form the first and second capacitors, the first capacitor is adjacent to the second capacitor, and a distance between opposing faces of the first capacitor and the second capacitor in the second direction is greater than (1) a distance between opposing faces of each adjacent (a) the at least one first inner electrode and (b) the at least one primary third inner electrode in the second direction and (2) a distance between opposing faces of each adjacent (a) the at least one second inner electrode and (b) the at least one secondary third inner electrode in the second direction.

2. The electronic component device according to claim 1, wherein:

each of the first and second outer electrodes includes an electrode portion on the first side surface; and an area of the first connecting conductor on the first side surface is larger than an area of the electrode portion on the first side surface.

3. The electronic component device according to claim 1, wherein an uneven portion is provided at an edge of the first connecting conductor in the first direction.

4. The electronic device according to claim 1, wherein the first connecting conductor and the second connecting conductor each have a greater rigidity than the base body.

5. An electronic component device comprising:

an electronic component including:

a base body having a pair of end surfaces facing each other in a first direction, first and second main surfaces facing each other in a second direction, and first and second side surfaces facing each other in a third direction;

a first connecting conductor and a second connecting conductor, a majority of the first connecting conductor being on the first side surface, and a majority of the second connecting conductor being on the second side surface, each of the first connecting conductor and second connecting conductor having a baked metal layer;

a first outer electrode on a first of the pair of end surfaces and a second outer electrode on a second of the pair of end surfaces; and an inner conductor in the base body and including:

at least one first inner electrode electrically connected to the first outer electrode and that is closer to the first main surface than to the second main surface;

at least one second inner electrode electrically connected to the second outer electrode and that is closer to the second main surface than to the first main surface;

at least one primary third inner electrode that faces the at least one first inner electrode, is electrically connected to the baked metal layers of the first connecting conductor and second connecting conductor, and includes a first connection portion connecting to the first connecting conductor and a second connection portion connecting to the second connecting conductor; and at least one secondary third inner electrode that faces the at least one second inner electrode, is electrically connected to the baked metal layers of the first connecting conductor and second connecting conductor, and includes a first connection portion connecting to the first connecting conductor and a second connection portion connecting to the second connecting conductor;

a first metal terminal electrically connected to the first outer electrode and a second metal terminal electrically connected to the second outer electrode;

a first joint portion joining and electrically connecting the first outer electrode to the first metal terminal and a second joint portion joining and electrically connecting the second outer electrode to the second metal terminal;

a first capacitor formed by the at least one first inner electrode and the at least one primary third inner electrode, the first capacitor being in the first half of the electronic component; and a second capacitor formed by the at least one second inner electrode and the at least one secondary third inner electrode, the second capacitor being in the second half of the electronic component, wherein the first capacitor and the second capacitor are connected in series, the at least one first inner electrode is not on a common plane with the at least one of second inner electrode, only the at least first inner electrode, the at least one second inner electrode, the at least one primary third inner electrode, and the at least one secondary third inner electrode are internal conductors of the base body that form the first and second capacitors, the first capacitor is adjacent to the second capacitor, and a distance between opposing faces of the first capacitor and the second capacitor in the second direction is greater than (1) a distance between opposing faces of each adjacent (a) the at least one first inner electrode and (b) the at least one primary third inner electrode in the second direction and (2) a distance between opposing faces of each adjacent (a) the at least one second inner electrode and (b) the at least one secondary third inner electrode in the second direction.

6. The electronic component device according to claim 5, wherein:

each of the first and second outer electrodes includes an electrode portion on the first side surface; and an area of the first connecting conductor on the first side surface is larger than an area of the electrode portion on the first side surface.

7. The electronic component device according to claim 5, wherein an uneven portion is provided at an edge of the first connecting conductor in the first direction.

* * * * *